United States Patent [19]
Drake

[11] Patent Number: 6,050,525
[45] Date of Patent: Apr. 18, 2000

[54] ASYMMETRIC OPEN ROSETTE CONSTELLATIONS

[75] Inventor: John Howard Drake, Santa Clara, Calif.

[73] Assignee: Lockheed Martin Corporation, Sunnyvale, Calif.

[21] Appl. No.: 09/069,090

[22] Filed: Apr. 28, 1998

Related U.S. Application Data

[60] Provisional application No. 60/045,056, Apr. 29, 1997.

[51] Int. Cl.$^7$ ....................................................... B64G 1/10
[52] U.S. Cl. ..................... 244/158 R; 701/226; 455/12.1
[58] Field of Search ........................ 244/158 R; 701/226; 455/12.1, 13.2

[56] References Cited

U.S. PATENT DOCUMENTS

| | | |
|---|---|---|
| 3,995,801 | 12/1976 | Bond . |
| 5,267,167 | 11/1993 | Glickman . |
| 5,471,641 | 11/1995 | Dosiere et al. . |
| 5,527,001 | 6/1996 | Stuart . |
| 5,678,175 | 10/1997 | Stuart et al. . |
| 5,806,801 | 9/1998 | Steffy et al. . |
| 5,911,389 | 6/1999 | Drake . |
| 5,957,409 | 9/1999 | Castiel et al. . |
| 5,979,832 | 11/1999 | Draim . |

OTHER PUBLICATIONS

Walker, J.G., "Circular Orbit Patterns Providing Continuous Whole Earth Coverage",Royal Aircraft Establishment, Technical Report 70211, Nov. 1970.

Walker, J.G., "Continuous Whole–Earth Coverage by Circular–Orbit Satellite Patterns", Royal Aircraft Establishment, Technical Report 77044, Mar. 24, 1977.

Walker, J.G., "Coverage Predictions and Selection Criteria For Satellite Constellations", Royal Aircraft Establishment Technical Report 82116, Dec. 2, 1982.

Walker, J.G., "Satellite Patterns for Continuous Multiple Whole–Earth Coverage",Royal Aircraft Establishment, 1978.

Walker, J.G., "Comments on Rosette Constellations of Earth Satellites", IEEE Transactions on Aerospace and Electronic Systems, vol. AES–18, No. 4, Nov. 1982.

*Primary Examiner*—Peter M. Poon
*Assistant Examiner*—Tien Dinh
*Attorney, Agent, or Firm*—Feix and Feix

[57] ABSTRACT

An asymmetric open rosette constellation has multiple inclined orbit planes distributed around 360° with the satellites asymmetrically spaced in the orbit planes. The satellites populate only a portion of each orbital plane so as to leave an open space in each orbital plane. The open architecture can readily accommodate spare satellites in a useful manner.

55 Claims, 6 Drawing Sheets

FIG_1

FIG_2

FIG_3

FIG_5

ASYMMETRIC OPEN ROSETTE CONSTELLATIONS

This application claims the priority of my pending provisional Application Serial No. 60/045,056 filed Apr. 29, 1997 and entitled "ASYMMETRIC OPEN ROSETTE CONSTELLATIONS."

BACKGROUND OF THE INVENTION

This invention relates to satellite constellation architectures.

This invention relates particularly to constellation architectures which have multiple inclined orbit planes distributed around 360° with the satellites asymmetrically spaced in the orbit planes and with the satellites populating only a portion of each orbital plane so as to leave an open space in each orbital plane.

The coverage of the earth surface provided by various patterns of satellites has been the subject of many studies.

The results of certain ones of such studies have been published in the following publications.

(1) *Royal Aircraft Establishment,* Technical Report 70211, November 1970 "Circular Orbit Patterns Providing Continuous Whole Earth Coverage" by J. G. Walker, available from NTIS (National Technical Information Service, U.S. Department of Commerce, Springfield, Va. 22161);

(2) *Royal Aircraft Establishment,* Technical Report 77044, Mar. 24, 1977, "Continuous Whole-Earth Coverage by Circular-Orbit Satellite Patterns" by J. G. Walker, available from NTIS (National Technical Information Service, U.S. Department of Commerce, Springfield, Va. 22161);

(3) *Royal Aircraft Establishment,* Technical Report 82116, December 1982, "Coverage Predictions and Selection Criteria for Satellite Constellations" by J. G. Walker, available from NTIS (National Technical Information Service, U.S. Department of Commerce, Springfield, Va. 22161);

(4) "Satellite Patterns for Continuous Multiple Whole-Earth Coverage" by J. G. Walker, Space Department, Royal Aircraft Establishment, Farnborough, U. K., presented as a publication at the International Conference on Maritime and Aeronautical Satellite Communication and Navigation on Mar. 7–9, 1978 at The Institution of Electrical Engineers, Savoy Place, London WC2.

Each of the four publications listed above is incorporated by reference in this application.

My co-pending application Ser. No. 08/770,480 filed Dec. 20, 1996 and entitled "Wave Based Satellite Constellation" and assigned to the same assignee as the assignee of this application illustrates and describes a number of wave based satellite constellations, and said application Ser. No. 08/770, 480 is incorporated by reference in this application.

Certain forms of constellation architectures are commonly referred to as Walker Rosettes architectures. The architectures have been given the name Walker Rosettes in reference to the originating designer of such constellations and because of the rose petal tip appearance of the intersecting orbit planes when the constellations are viewed from a polar perspective.

The Walker Rosettes constellation architectures have multiple inclined orbit planes distributed around 360° and always have satellites symmetrically positioned and equally spaced in each of the orbit planes.

As will be described in more detail below, Walker Rosettes which have satellites symmetrically positioned and evenly spaced in each of the orbit planes can require a greater number of satellites to obtain single or odd levels of coverage of the earth surface than the asymmetric open rosette constellations architecture of the present invention for large constellations.

The prior art Walker Roseffes constellation architectures also have not provided space in the orbit planes for additional satellites for growth or as spares.

SUMMARY OF THE PRESENT INVENTION

It is an important object of the present invention to configure a family of constellation architectures which, like Walker Rosettes, have multiple inclined orbit planes distributed around 360°, but which have satellites asymmetrically spaced in each of the planes and which may also have satellites unequally spaced in each of the planes.

In the family of constellation architectures of the present invention the orbit planes themselves may be unequally spaced around the earth.

It is a related object to configure a family of constellation architectures which have satellites asymmetrically spaced in the orbit planes and which populate only a portion of the orbit plane with satellites so as to leave an open space or gap in each of the planes of the completed constellation.

The constellations are thus open in the sense that there is space available for additional satellites for growth or as spares.

All of the satellites are phased so that corresponding satellites in each orbital plane all reside on a single wave form which rotates about the earth on an axis normal to the plane of reference for the inclination angle of the orbit planes. The wave form has at least two cycles. There is a leading wave form containing a leading satellite in each orbital plane and a trailing wave form containing a trailing satellite in each orbital plane.

The satellites within the orbit plane may not, in the most general case, be spaced in exact fractions of a full orbit circle and may not have equal angle intervals between them.

These more general specifications of the family of constellation architectures of the present invention allow great flexibility in the patterns of satellite positions which are formed over the earth's surface for use primarily with very large constellations.

Properly spaced satellite or orbit plane intervals can provide more complex satellite position patterns on the earth for efficient coverage, such as, for example, nearly uniform hexagons.

Other less uniform patterns have applications for growth and for positioning of spares.

Properly spaced satellites or orbit plane intervals can also provide efficient above the horizon coverage.

Asymmetric open rosette constellations and methods which incorporate the features noted above and which are effective to function as noted above comprise specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used

BRIEF DESCRIPTION OF THE DRAWING VIEWS

FIG. 2 illustrates the wave forms of a constellation of satellites comprising a plurality of orbit planes each having the orbit plane architecture shown in FIG. 1. The waves illustrated in FIG. 2 have two cycles and rotate at one half the rate of orbit rotation of the satellites.

FIG. 3 shows the earth and a wave form 40 for a wave traced by satellites in an orbit plane having three cycles. A perspective view of a wave form for a wave having two cycles (as illustrated in the Mercator projection of FIG. 2) would have the appearance of the seams on a baseball. Wave forms for waves having larger numbers of cycles have larger numbers of laterally extending loops than the three polar visible loops shown in FIG. 3.

FIG. 4 illustrates how each satellite can have a cone of non-coverage in some conditions and/or in certain spectral ranges (such as, for example, the infrared spectral range) because of visual impairment (1) which can be caused by the Earth and (2) which can be caused also, in at least some cases, by an atmosphere layer surrounding the Earth. FIG. 4 also illustrates how adjacent satellites can be positioned so that the cone of non-coverage for one satellite is at least partially covered by the coverage of an adjacent satellite. The coaction in the above the horizon coverage between two adjacent satellites as illustrated in FIG. 4 can be configured to occur (1) between two adjacent satellites in the same orbit ring or (2) between adjacent satellites in a wave or (3) between adjacent satellites in adjacent orbit rings or waves.

FIG. 5 illustrates how the positioning of the three adjacent satellites can eliminate holes in the cone of non-coverage of any one of the three individual satellites to provide at least a single layer of above the horizon coverage throughout the angles of coverage of the three satellites.

DETAILED DESCRIPTION OF THE PREFERRED EMBODIMENTS

Figure 1:
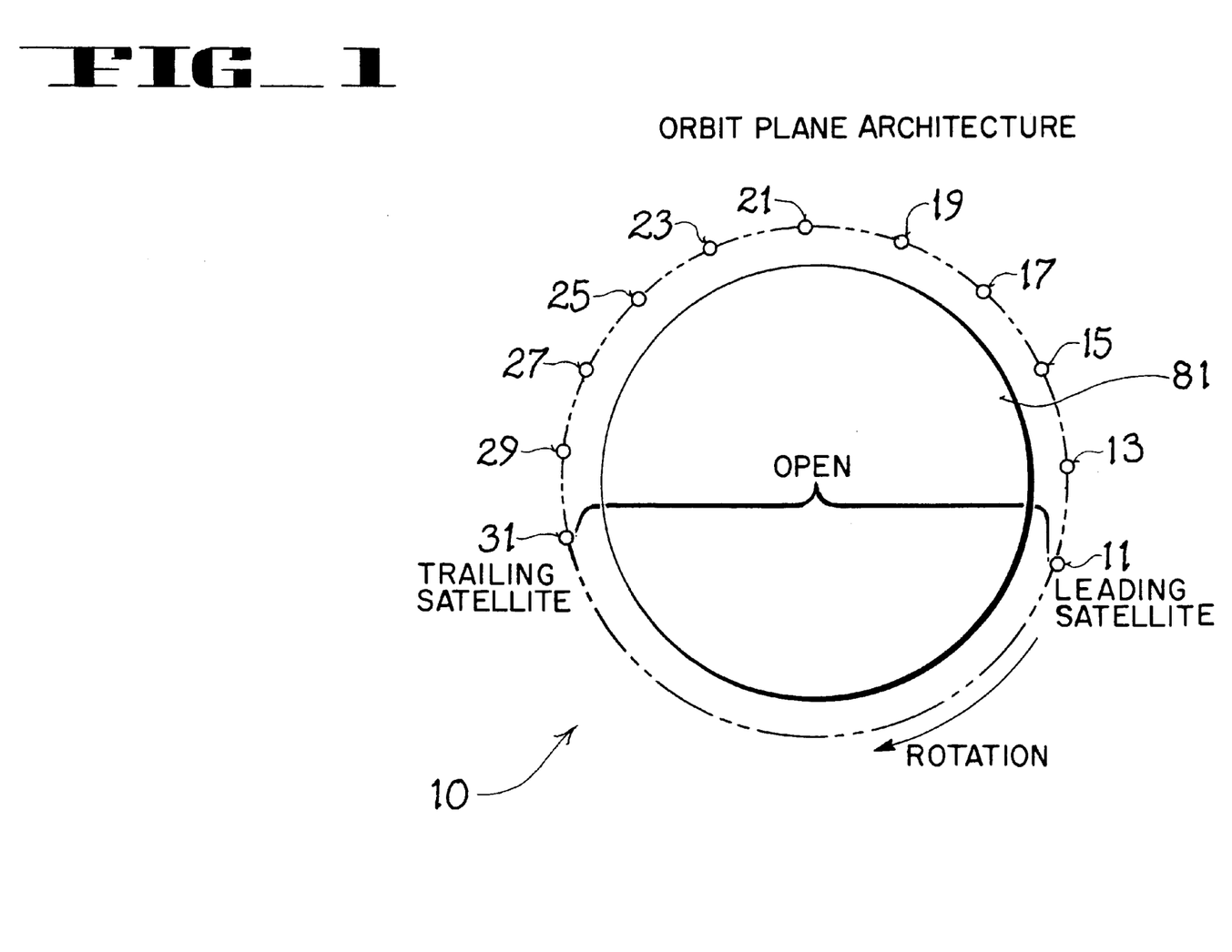
FIG. 1 is a plan view of an orbit plane architecture used in an asymmetric open rosette constellation architecture constructed in accordance with one embodiment of the present invention.

In FIG. 1 an orbit plane architecture is indicated by the general reference numeral 10.

In the FIG. 1 illustration of the orbit plane architecture, the direction of orbit rotation is indicated, and the leading satellite 11 and trailing satellite 31 are noted.

In addition to the configuration of the individual orbit planes 10 the next important feature of this invention is the wave architecture (shown in and described below with reference to FIG. 2) determined by the relative phase relationships of the multiple orbit planes 10 in the completed constellation.

Each of the corresponding satellites in each orbit plane are identified with a wave number 41–61 (see FIG. 2) starting with the wave 41 comprising the leading satellites 11 and ending with wave 61 comprising the trailing satellites 31.

Figure 2:
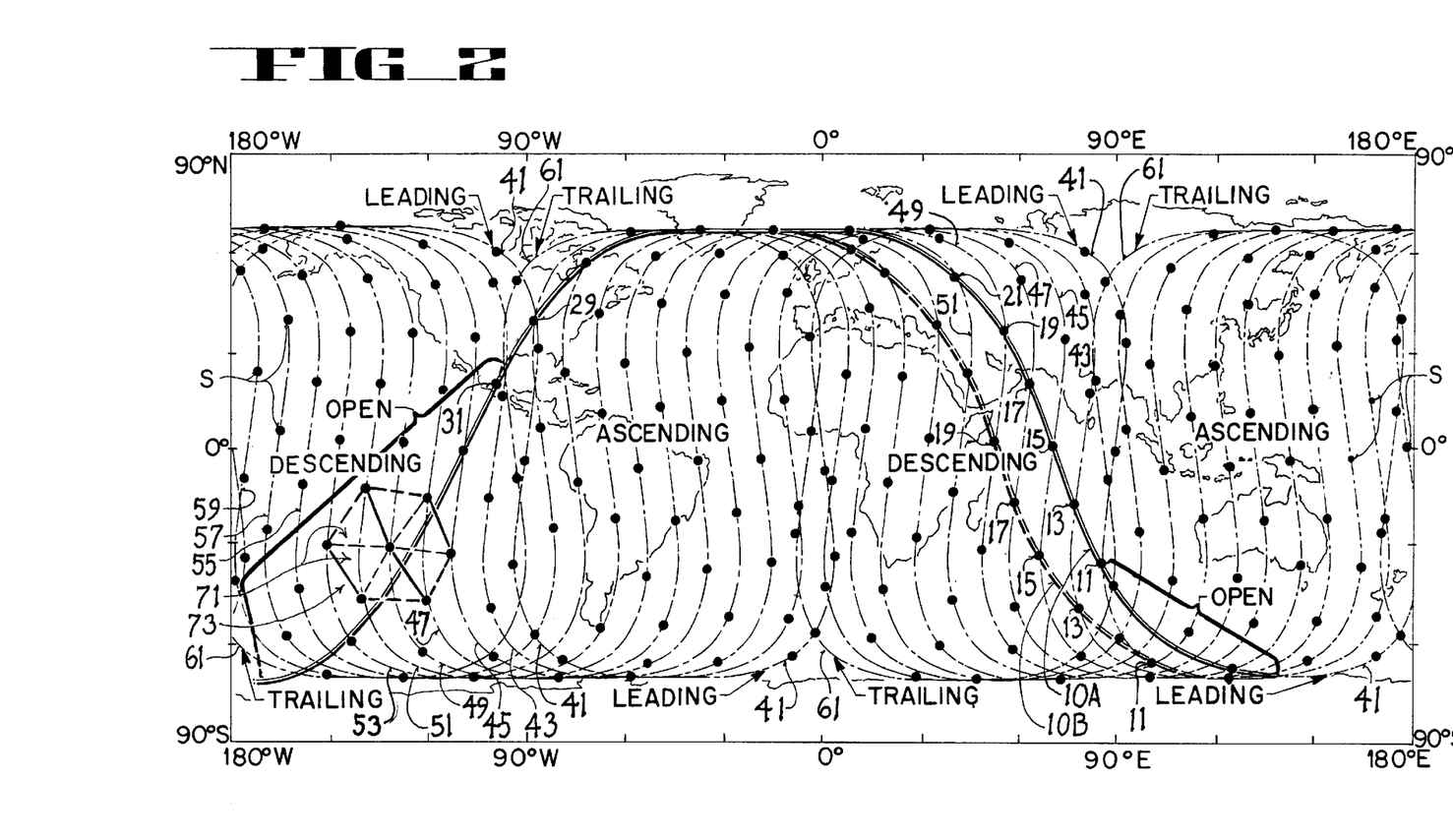
FIG. 2 is a side elevation view showing, in the background, the earth in Mercator projection and showing, in the foreground, an example wave architecture for an asymmetric open rosette constellation constructed in accordance with one embodiment of the present invention.
Figure 3:
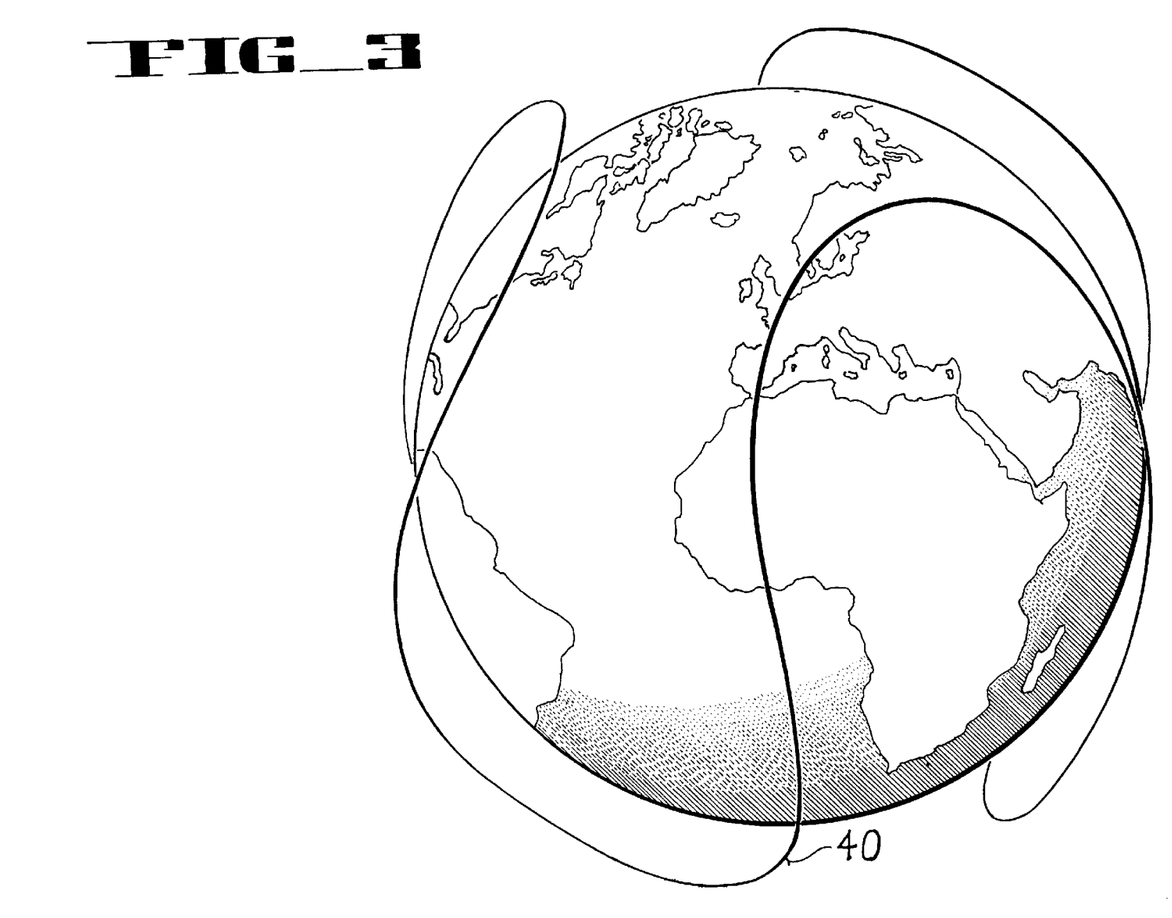
FIG. 3 is a perspective view to illustrate just a single wave form.

Thus the leading satellites 11 in all the planes are phased with respect to each other so that they will all reside on a single wave form 41 which rotates around the earth on an axis normal to the plane of reference for the inclination angle of the planes. The planes are all at the same inclination angle with respect to the reference plane which is normally the earth's equator.

The wave forms 41–61 generated can be any number of cycles greater than two, but the principle interest is in the simplest two cycle wave form which is the most likely useful embodiment of this invention.

Each of the wave forms 41–61 shown in FIG. 2 is a two cycle wave form.

The two cycle wave form is generated when the lead satellites 11 (and for that matter each of the successive satellites 13–31 which follow) are phased appropriately. The rotation speed of the wave is one half of the orbital rotation speed of the satellites in their respective planes.

The solution to this problem for equally spaced planes can be stated as a Walker code (P/P/P-2). The Walker code is defined in the literature as three numbers. The first number is the number of satellites, the second number is the number of planes and the third number is the phase number indicating the phase shift of each successive plane to the east of each plane.

Phase number is the number of units of shift in fractions of an orbit revolution 1/T, where T is the total number of satellites.

In my solution for two cycle waves, both the number of planes and number of lead satellites is P equal to T.

Now any satellite rotating in any orbit plane can be viewed in a coordinate frame rotating at one half the orbit speed as residing on such a two cycle wave in which the wave will be traced out in this rotating frame.

As described in detail in my co-pending application Ser. No. 08/770,480 filed Dec. 20, 1996 (and incorporated by reference in this application as noted above) the rotating frame may be visualized as a sphere, like the sphere 150 shown in FIG. 4 of said application Ser. No. 08/770,480.

In the solution given for the relative phase relationships as given by a Walker code for the case of equally spaced orbit planes, I have specified a solution where all of the satellites specified by the code will trace out the same wave in the rotating coordinate frame.

It is, of course, also possible to solve this problem for planes at arbitrary spacing, but it cannot be so simply specified as a Walker code as done in this example.

It is important to recognize that the waves so generated are fully populated.

In the case of uniformly spaced orbit planes, the satellites are substantially equally spaced on the waves.

As pointed out in said application Ser. No. 08/770,480, since the predetermined order of the satellites along a wave is preserved as the satellites orbit the earth, a permanent communications network based upon each satellite maintaining a permanent communications link with the satellite positioned adjacent to it along the wave may be maintained. In this communications network, each satellite in the wave communicates with the same two satellites. Hence, no switching or only minimal switching of cross links may be required.

FIG. 2 shows how the combined wave architecture of the constellation appears in my example embodiment of the invention.

In this FIG. 2 the lead satellites 11 in each of the orbit planes 10 are associated with the leading two cycle wave 41 shown while the trailing satellites 31 in each plane are associated with the trailing wave 61. Each of the satellites 13–29 in each orbit plane is associated with a respective wave 43–59.

The number of satellites 11–31 in the partially filled planes 10 and the space between the satellites 11–31 are just sufficient to fill the space between the leading 41 and trailing 61 wave forms so that the entire earth is covered at least up to some desired latitude.

With relatively small angles of ground coverage the separation between the leading satellite 11 and the trailing satellite 31 in each orbit plane 10 must be about 180° in order for the leading wave 41 and trailing wave 61 to approach each other or to slightly overlap as shown in FIG. 2.

The reason for this is that each wave advances at one half the orbit speed. Therefore one half of an orbit revolution is equivalent to one quarter advancement of the wave front defining the respective associated wave.

Overlap is not an essential feature in all applications. The leading wave 41 and the trailing wave 61 need only butt up to each other or be close enough to each other so that coverage is provided. If the coverage circles of the satellites are large enough, it is not essential to have overlap. Close enough may be just 45° away. If it is not necessary to go to very high latitudes, then overlap may not be necessary.

The spacing of all satellites between the leading and trailing satellites determines the space of the waves 41–61 in accordance with this two for one ratio in relative angular change between orbit position and wave front position in the rotating coordinate frame moving at the wave speed.

In FIG. 2 the positions of the satellites along the waves 41–61 (for the snapshot in time represented in FIG. 2) are illustrated by darkened circles and indicated by the characters S.

As indicated in the wave architecture shown in FIG. 2, the result of this spacing of the satellites in each plane and the relative phasing of each plane with respect to others is to lay out single layers of satellite coverage patterns in ascending and descending groups in four longitudinal quadrants (as indicated by the legends "Ascending" and "Descending" in FIG. 2).

In this example the planes and satellites per plane were equally spaced, and the resulting satellite patterns are near equilateral triangles 71. See the triangle patterns 71 indicated in FIG. 2 (and constructed by drawing three solid lines between adjacent satellites in the same orbit plane and associated phantom lines which interconnect the locations of certain satellites in different waves) during a certain snapshot in time, on the "Descending" quadrant. Each of the three solid lines is drawn between consecutive satellites in one orbit plane, and the three solid lines represent consecutive orbit planes. The phantom lines are drawn between the satellites on the solid lines to complete the showing of the equilateral triangle patterns 71.

Equilateral triangles are an efficient pattern for single coverage of the earth.

It will be noted that the triangles can be grouped into hexagonal patterns 73 consisting of six triangles 71.

If the satellites at the centers of each hexagon were deleted, it is easily seen that a constellation forming uniform hexagons is feasible.

This is an efficient pattern for dual earth coverage.

The pattern is formed by deleting every third satellite in each plane of the original configuration, and thus is one in which the satellites in each orbit plane 10 are not equally spaced.

There are alternative configurations of satellites per plane and number of planes such that the hexagons are rotated and are formed by spacing the planes in such a way that every third plane is deleted from a larger set of equally spaced planes.

It will thus be apparent to one skilled in the art (having the teaching of this invention) that it is possible to construct a great variety of coverage patterns as desired for different types of coverage. This variety of coverage patterns may, for example, also include rectangles.

The advantages of this asymmetric open rosette constellation architecture over classical solutions are very significant for some applications.

First is the fact that the constellation separates the ascending and descending satellites into groups of single layers (as indicated by the four quadrants in FIG. 2).

These single layers form efficient coverage patterns, and the relative positions of nearby satellites is well behaved.

The satellites remain close to each other in what may be regarded as swarm or group which can easily be connected together with satellite cross links.

The formation of the single layers of ascending and descending groups provides efficient coverage for large constellations while not requiring that the satellites be in polar orbits as for the classical Walker star constellations which also form single layers and patterns.

In the prior art the star constellation polar orbits produce more efficient single coverage for large constellations than the Walker rosette constellations with inclined orbits. The reason for this is that rosette constellations have planes distributed around a full 360°; and since the satellites in each plane fill the planes with uniformly distributed satellites, there are always equal numbers of satellites ascending and descending over a region of the earth. This results in the formation of both ascending and descending layers of satellites which are not as easily connectable with cross links and must form efficient coverage with both layers in order to avoid holes in coverage.

The Walker rosette constellations are therefore more efficient for dual coverage and less efficient for single coverage when compared to single layered star configurations.

The feature of the current invention is that it can form single layers with inclined orbits and can evolve to a dual layered rosette constellation as a growth capability without doubling the constellation size.

It therefore is substantially the same or better efficiency than a star constellation for a latitude band of interest and can grow to dual coverage with fewer satellites.

It also is an open architecture with partially populated planes and thus can readily accommodate spare satellites in each plane in a useful manner. This is extremely important for large constellations, since failures will occur frequently; and it is difficult to repair and to maintain coverage.

It is another feature of this invention that an additional asymmetric open rosette coverage layer can be superimposed on a full Walker rosette constellation either by adding satellites between the existing satellites in the planes or by adding planes between existing planes.

The prior art Walker star and rosette constellations are closed architectures which do not in general have space provided for spare satellites. The spares must be positioned to avoid potential collisions with other satellites.

In this invention, spare satellites (and additional asymmetric open rosette coverage layer) locations are predetermined in a larger architecture which does not risk collisions while providing useful multiple coverage overlap and none of the growth requires repositioning existing satellites.

The fact that inclined orbits are used is important, because more launch weight to orbit is available; and it is possible to resupply satellite spares by placing satellites in a lower parking orbit and allowing natural orbit precession from gravitational perturbations to resupply multiple planes with one launch to the parking orbit.

This significantly reduces the cost of deploying and maintaining large constellations of satellites where multiple satellites per launch vehicle is cost effective.

Coverage is more concentrated at the mid-latitudes, rather than at the pole. Certain applications, such as communications satellites, have the most need for coverage at mid-latitudes.

The combination of efficient sparing and resupply, flexibility in spacing and adjustment of spacing of satellites within an orbit plane, and excellent growth in coverage are essential attributes of this constellation architecture that make it attractive for many future applications involving large constellations of satellites for earth coverage. Cost savings are expected to be substantial in such future applications.

The arbitrary architecture of the present invention allows an architect to lay out an idealized configuration of satellites covering the earth in a pattern, and the pattern can be generated with the concept of the present invention in a very structured way.

A key feature of the architecture of the present invention is the openness. Each of the orbit rings has an open gap between the trailing satellite and the leading satellite, even though the waves are fully populated.

The open gap in each of the orbit rings permits flexibility in creating functional features while the waves permit the formation of patterns which can provide optimal coverage on the earth.

The moving patterns formed within adjacent waves approach the efficiency of satellites which are stationary over the earth and which are exactly configured in a stationary patten that is desired.

The openness of the orbit rings permit adding spares which may function as extra assets in the areas needed, such as, for example, in the hexagon patterns in the ascending and descending areas of the shear zone where the leading satellites are always sort of passing by the trailing ones. Spares in this area provide more communication capabilities to do all the switching which may be required in this particular zone.

As described in detail above, the novel constellation architecture of the present invention has utility in earth coverage applications. In this embodiment the circle of coverage on the ground for each satellite may be relatively small. The path between an earth station and a satellite is usually desired to be as near vertical as possible. As the angle of inclination from the vertical increases, obstructions (such as trees and adjacent buildings) or rain and other atmospheric conditions can block or interfere with transmissions to and from the satellite.

In another embodiment of the present invention the asymmetric open rosette constellation architecture has utility for above the horizon (ATH) coverage.

The angles of coverage of individual satellites in above the horizon coverage are typically larger than the angles of coverage of satellites in earth coverage applications.

In above the horizon coverage the satellite is looking for objects or targets which are above the earth. You may not be able to detect a target when looking with the earth as a background.

You may instead have to look with a space background.

For example, when the earth itself appears as a bright object, you may not be able to see a target against the earth.

This visual impairment can be caused also, in at least some cases, by an atmosphere layer surrounding the earth. In order to detect a target, the target has to be at or above a grazing height that the satellite cannot see below.

Each satellite therefore has a cone of non-coverage within its zone of the above the horizon coverage because of such visual impairment.

In order to provide above the horizon coverage surrounding the entire earth, the satellites in a constellation must be positioned with respect to one another so that the unobstructed coverage of one or more adjacent satellites extends into the cones of non-coverage of other adjacent satellites to eliminate what could otherwise be a loss of coverage in such cones.

The asymmetric open rosette constellation architecture of the present invention has particular utility in providing efficient above the horizon coverage.

The features of this above the horizon coverage embodiment of the present invention will now be described with particular reference to FIGS. 4, 5 and 2 of the drawings.

In FIG. 2 a complete first orbit plane 10A is indicated and a portion of a second, adjacent orbit plane 10B is indicated.

In FIG. 2 the complete orbit plane 10A includes the open space or gap indicated by the legend "open" in FIG. 1 and FIG. 2.

In FIG. 2 only a portion of the adjacent orbit plane 10B is shown in order to simplify the illustration.

As can be seen from FIG. 2, each of the leading satellites 11 of the two orbit planes 10A and 10B are on the wave 41, each of the satellites 13 are on the wave 43, each of the satellites 15 are on the wave 45, etc.

FIG. 2 also illustrates, that where orbit rings are unpopulated, that is where the oppositely directed layer is passing. Thus, for example, where the satellites, 11, 13, 15, 17, 19, 21 of the orbit ring 10A are in the part of the descending quadrant and leave an open gap preceding the leading satellite 11 in the unpopulated open part of the orbit ring 10A, the oppositely directed ascending quadrant has satellites which pass through that open part of the orbit ring 10A.

Similarly, where the trailing satellite 31 of orbit ring 10A is in an ascending quadrant of waves, the open gap behind the trailing satellite 31 in the orbit ring 10A is where the oppositely directed descending waves are passing. These descending waves pass through that part of the open gap in the orbit plane 10A.

As will be more clear from the description below, it is this feature of the present invention which makes it possible to obtain continuous above the horizon coverage.

Figure 4:
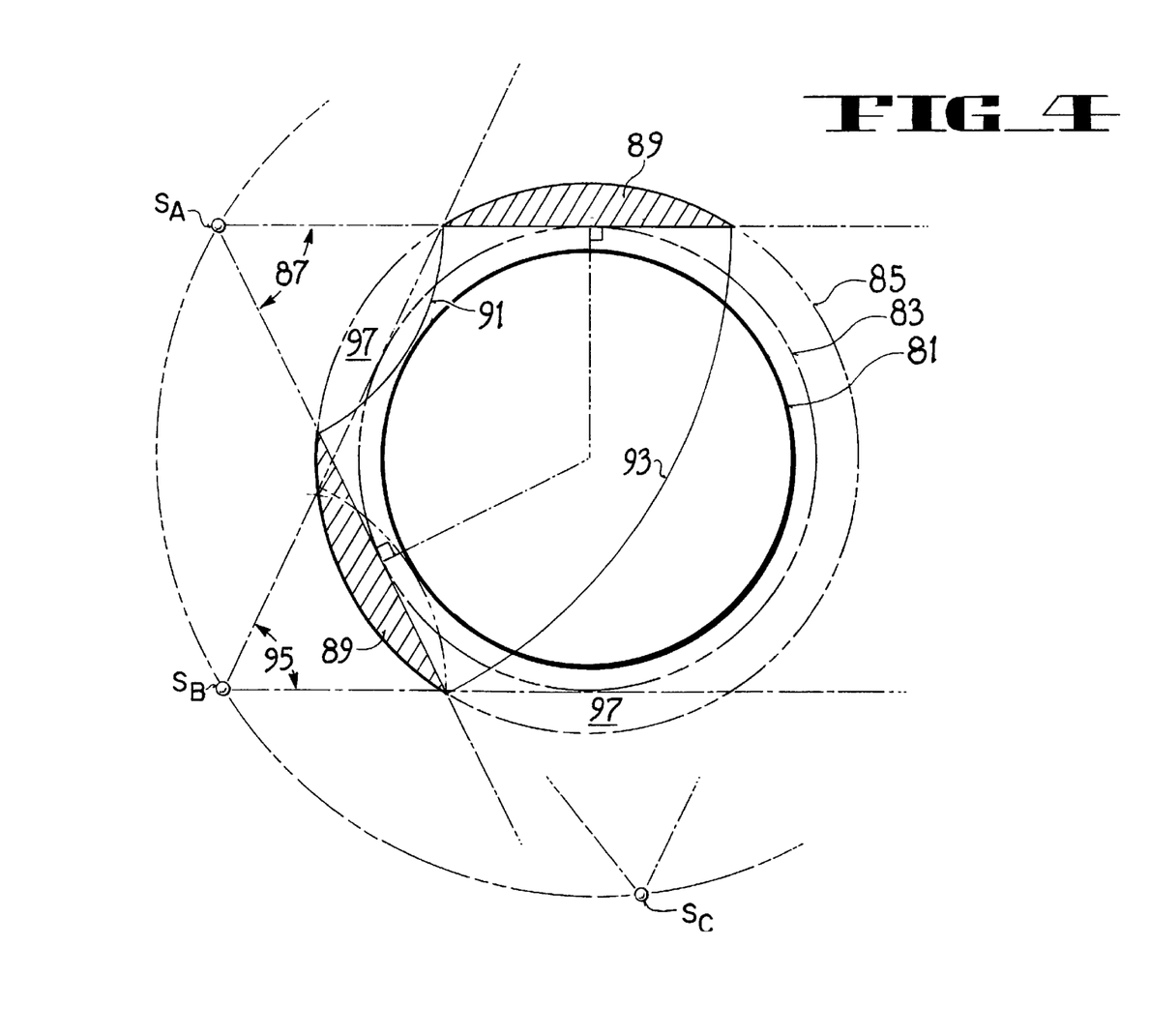
FIG. 4 is a diagrammatic side elevation view, partly in cross section, illustrating the positioning and functioning of two adjacent satellites used in an asymmetric open rosette constellation architecture constructed for above the horizon coverage in accordance with another embodiment of the present invention.

FIG. 4 is a diagrammatic side elevation view which illustrates problems and techniques involved in providing above the horizon coverage.

In FIG. 4 the earth is indicated by the reference numeral 81, the upper limit of the atmosphere which can impair above the horizon coverage is indicated by the reference numeral 83, and the altitude at which above the horizon coverage must be provided is indicated by the reference numeral 85.

A satellite $S_A$, looking for a target between the earth 81 and the altitude 85 can have a cone of non-coverage 87 because of visual impairment caused by the earth 81 and by the atmosphere layer 83 surrounding the earth.

As a result, the satellite $S_A$ cannot detect any target within the cone 87. But the satellite $S_A$ can detect any target which is anywhere outside the cone 87.

The satellite $S_A$ can therefore detect any target which is within the cross hatched areas 89 in FIG. 4. The zone 89 actually extends as an annulus extending completely around the earth 81 and the upper atmosphere 83 (as indicated by the arcs 91 and 93 of the annulus as illustrated in FIG. 4).

As illustrated in FIG. 4, the hole in the coverage of the satellite $S_A$ which corresponds to the interior of the cone 87 can be covered by one or more satellites adjacent to satellite $S_A$.

Thus, as illustrated in FIG. 4, an adjacent satellite $S_B$, having its own cone 95 of non-coverage, can provide above the horizon coverage outside its cone 95 so as to extend into the cone 87 of non-coverage of the satellite $S_A$. The satellite $S_B$ provides at least partial above the horizon coverage within the cone of non-coverage of the satellite $S_A$.

In the relative positions of the satellites $S_A$ and $S_B$ with respect to the earth 81 and the upper atmosphere 83, the satellite $S_B$ provides complete above the horizon coverage within the part of the cone 87 which is located in the upper left hand portion of FIG. 4, and the satellite $S_B$ provides partial above the horizon coverage within the portion of the cone 87 which is located at the bottom part of FIG. 4. The annulus of the above the horizon coverage provided by the satellite $S_B$ has not been cross hatched in FIG. 4 (in order to keep the illustration less complicated), but the above the horizon coverage of satellite $S_B$ includes the areas indicated by the underlined reference numeral 97 in FIG. 4 (and the annulus connecting those two areas). The areas 97 are the areas which are within the outer circle 85 and which are on the outside of the cone 95.

In FIG. 4 a third satellite $S_C$ is shown as lying in the plane of the drawing sheet and at the same altitude with respect to the earth 81 as the satellites $S_A$ and $S_B$.

The above the horizon coverage provided by the satellite $S_C$ would, in the relative positions illustrated in FIG. 4, provide above the horizon coverage in the hole in such a coverage existing within the cone 95 and would also provide above the horizon coverage in portions of the horizon which lie on the backside of the earth 81 with respect to the satellite $S_A$ (that is, portions of the horizon which are located at the lower right hand side of FIG. 4).

Thus, the above the horizon coverage of each of the satellites $S_A$, $S_B$ and $S_C$ coacts with the coverages of adjacent satellites so that the cone of non-coverage for one satellite is at least partially covered by the coverage of an adjacent satellite.

The coaction of above the horizon coverage illustrated between adjacent satellites in FIG. 4 can occur (1) between two adjacent satellites in the same orbit ring or (2) between adjacent satellites in a wave or (3) between adjacent satellites in adjacent orbit rings or waves.

Figure 5:
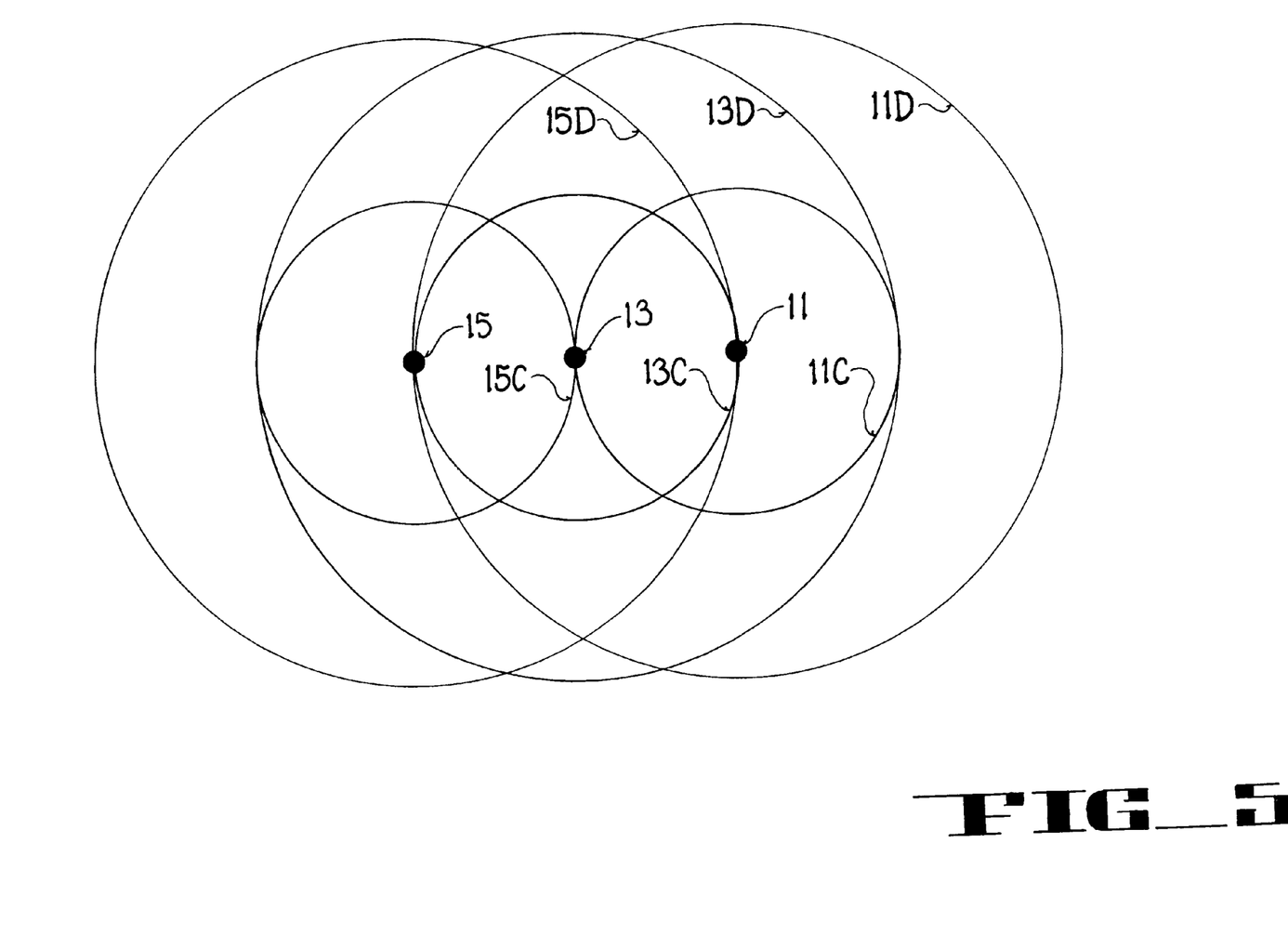
FIG. 5 is a diagrammatic plan view and shows how three adjacent satellites in one orbit ring can be positioned to provide at least single above the horizon coverage in all areas of the particular angle of coverage provided by each of the three satellites.

FIG. 5 is a plan view illustrating how three adjacent satellites can be positioned relative to one another within an asymmetric cluster in a single orbit plane (like that illustrated in FIG. 1) in the present invention so as to provide at least single above the horizon coverage throughout the angles of coverage of the three satellites in the orbit plane.

As illustrated in FIG. 5 the satellite 11 has a cone of non-coverage indicated by the circle 11C and has an angle of coverage which extends out to the circle 11D. The circle 11D is large enough to pick up any target at a specified altitude such as, for example, the specified altitude 85 shown in FIG. 4. The satellite 11 thus provides a doughnut (as viewed in the plan view of FIG. 5) of coverage between the circles 11C and 11D.

Similarly, the satellite 13 provides a doughnut of coverage between the inner circle 13C and the outer circle 13D, and the satellite 15 provides a doughnut of coverage between the inner circle 15C and the outer circle 15D.

By positioning the adjacent satellites within the orbit ring at the relative positions illustrated in FIG. 5 for the width of the doughnuts of coverage, it can be seen that the cone of non-coverage of the satellite 11 is completely covered by the doughnuts of coverages of the satellites 13 and 15; the cone of non-coverage 13C of the satellite 13 is completely covered by the doughnuts of coverage of the satellites 11 and 15; and the cone of non-coverage 15C of the satellite 15 is completely covered by the doughnuts of coverage of the satellites 11 and 13.

This relative positioning of all of the satellites 11 through 31 of the orbit plane architecture shown in FIG. 1 can eliminate any gap in above the horizon coverage for the satellites 11–31 within the asymmetric cluster of the orbit plane 10 shown in FIG. 1.

The satellite positioning shown in FIG. 5 thus provides at least single coverage throughout the cluster. Where the doughnuts of coverage of individual satellites overlap, the above the horizon coverage is increased by the number of overlaps. Some areas of the plan view shown in FIG. 5 have double coverage and some areas have triple coverage.

FIG. 2 (as discussed below) illustrates how coverage is provided in the open gap between the trailing satellite 31 and the leading satellite 11 of the asymmetric cluster in an orbit plane architecture like that illustrated in FIG. 1.

In FIG. 2 a single orbit plane is indicated by the reference character 10A, the individual satellites are indicated as 11, 13, 15 through 31 in that orbit plane 10A, and the open gap in that orbit plane is indicated by the two legends "Open" in FIG. 2.

As noted above, the part of the open gap in front of the leading satellite 11 in the descending quadrant occurs in the ascending quadrant at the right hand side of FIG. 1, and the open gap behind the trailing satellite 31 in the ascending part of the orbit ring 10A occurs in the descending quadrant at the left hand side of FIG. 2.

For both the above the horizon embodiment of the present invention and the below the horizon or ground coverage embodiment of the present invention, the asymmetric rosette constellation feature of the present invention works the same way.

Where an orbit plane is unpopulated with satellites is where the oppositely directed layer of the wave architecture is passing.

This can best be seen by looking at the left side of FIG. 2 where the trailing satellite 31 of the orbit ring 10A is in the ascending quadrant of waves. The open gap behind the trailing satellite 31 in the ascending orbit ring 10A is where the oppositely directed layer of descending waves are passing. The satellites in these descending waves fill in this open gap in the orbit ring 10A to provide continuous above the horizon coverage in this open part of the orbit ring 10A. Satellites in the descending waves are positioned to be, at all times, closely adjacent the open gap in the plane of the orbit ring 10A. The closely adjacent satellites provide continuous above the horizon coverage in that open portion of the orbit plane 10A.

Thus, satellites on the waves 45, 47, 49, 51, and 53 (in the snapshot of time illustrated by the FIG. 2 drawing) lie so close to the trace of the open gap behind the trailing satellite 31 in the orbit plane 10A so as to be practically continuations of the satellites in the orbit plane 10A.

The satellites on the orbit planes represented by the solid lines within the hexagon 73 shown in FIG. 2 (and the satellites in other adjacent orbit planes) continue to pass downwardly through the open gap in the orbit plane 10A in the time intervals following the snapshot in time illustrated in FIG. 2 to continue to provide continuous above the horizon coverage in that open gap.

The same function occurs in the portion of the open gap shown at the right hand end of FIG. 2, but the mechanics of the Mercator projection involved make visualizing that function somewhat more difficult than following the above description with respect to the open part of the gap illustrated in the left hand end of the FIG. 2.

In a specific embodiment of the asymmetric open rosette constellation used for above the horizon coverage in accordance with the present invention, the following constellation structure was employed.

Figure 6:
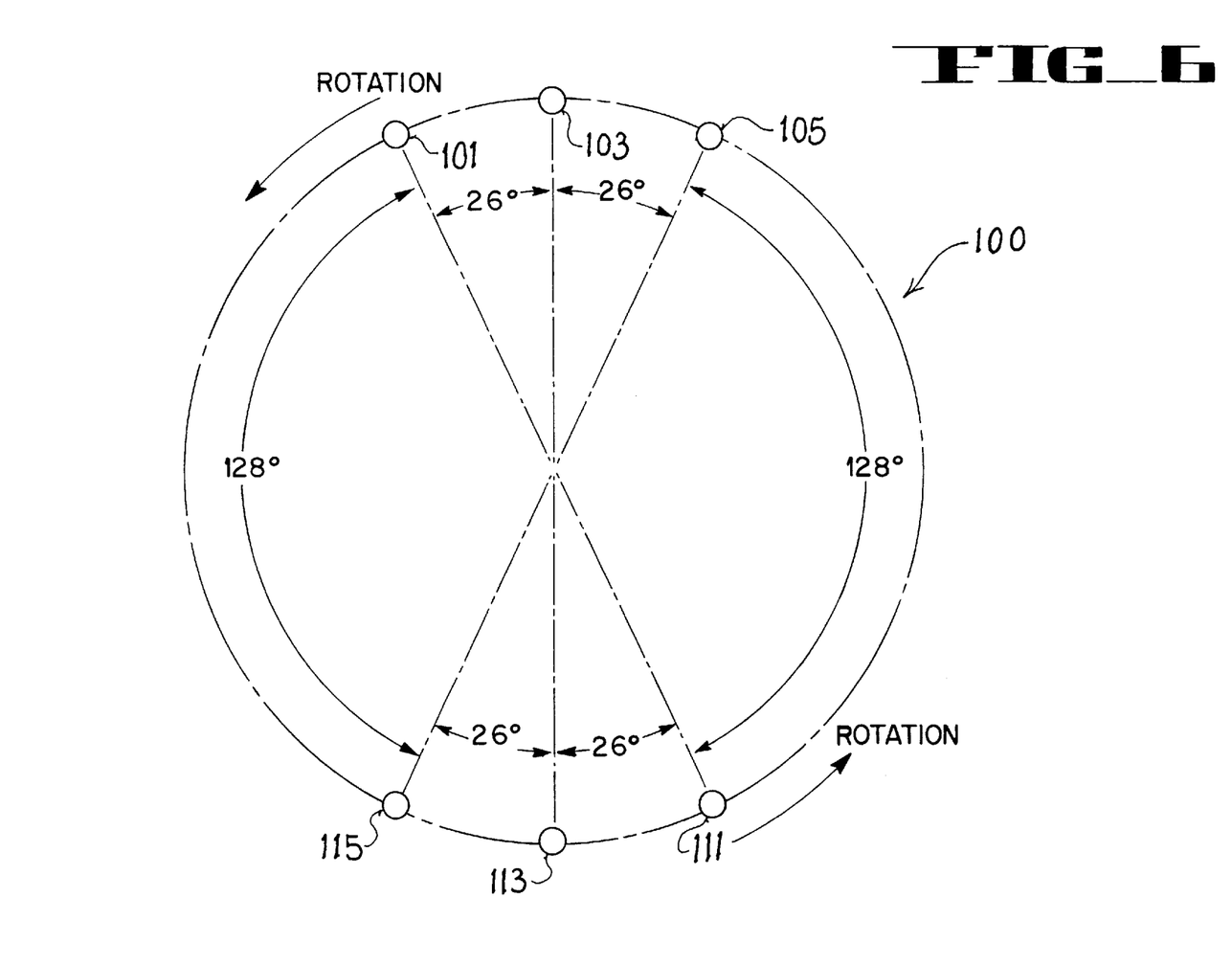
FIG. 6 is a plan view of an orbit plane architecture used in an asymmetric open rosette constellation architecture constructed in accordance with another embodiment of the present invention. The orbit plane architecture shown in FIG. 6 has two asymmetric clusters of satellites in the orbit plane and is used for above the horizon coverage. The orbit planes are phased to provide three cycle waves.

An orbit plane configuration illustrated in FIG. 6 has two lead or satellite clusters per plane, and the planes are phased to provide three cycle waves.

One cluster in the orbit plane 100 comprises a leading satellite 101, a second satellite 103 and a trailing satellite 105.

The second cluster in the orbit plane 100 comprises a leading satellite 111, a second satellite 113 and a trailing satellite 115.

The three satellites in each cluster have the spacing with respect to one another to achieve the coverage pattern shown in FIG. 5 and described in detail above.

In this specific embodiment of the invention there are five orbit planes 100. The five planes are equally spaced at 72° intervals around the equator. Each orbit plane is inclined at 55° with respect to the equatorial plane of reference.

The orbit altitude is 2,000 kilometers.

The orbit planes are phased so that each orbit plane at the next 72° interval to the east is advanced 72° in phase compared to its adjacent orbit plane.

This embodiment provides 100% above the horizon coverage by two or more (i.e., stereo) satellites with above the horizon views above a minimum line of sight grazing altitude of 75 kilometers for any target at or above 260 kilometers.

This particular embodiment is not optimal in the sense of requiring fewer satellites than other alternatives, but this particular embodiment is an open architecture with provision for spares and/or performance growth with additional satellites.

Other embodiments of above the horizon coverage constellations using three cycle waves in accordance with the present invention can be constructed by using a single cluster of satellites in an orbit plane rather than having two asymmetric leading satellite clusters per plane as illustrated in FIG. 6.

For example, another satellite constellation embodiment can be constructed using nine equally spaced planes with a single cluster of three satellites in each plane and with the orbit planes phased to provide three cycle waves.

The number of clusters in an orbit plane is determined by the number of lead satellites in a plane to form the desired wave structure.

Also, it should be noted that cycles other than two and three cycles can be produced in asymmetric open rosette constellations constructed in accordance with the present invention.

In a specific embodiment of the asymmetric open rosette constellation used for earth coverage in accordance with the present invention, the following constellation structure was employed.

1) There are 11 satellites per orbit ring; there are 21 partial, filled rings (planes).

2) Each of the 11 satellites within the cluster are spaced at equal intervals of 18.947° (360°/19).

3) 1,360 kilometer altitude circular orbits.

4) Designed for 40° elevation minimum single earth coverage up to 70° latitude.

5) 21 equally spaced planes at 70° inclination with respect to the equator.

6) Each adjacent plane to the east is advanced 325.714° (19/21×360°) in phase.

7) The open gap between the trailing satellite and the leading satellite in a cluster is 170.53°.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

What is claimed is:

1. A method of deploying a constellation of satellites in an asymmetric open rosette architecture orbiting about the earth by using multiple inclined orbital planes of satellites with the satellites in each plane asymmetrically spaced in a cluster so as to leave an open space or gap between a trailing satellite and a leading satellite in each of the orbital planes of the constellation, said method comprising, placing a first cluster of satellites in a first asymmetrical spacing in a first orbital plane inclined at a first angle with respect to a reference circle extending about the earth, said first cluster having a leading satellite and a trailing satellite, said first cluster of satellites populating only a portion of the orbital plane so as to leave a first open space or gap between the trailing satellite and the leading satellite in said first inclined orbital plane, placing additional clusters of satellites in asymmetrical spacings in additional inclined orbital planes and wherein each additional inclined orbital plane has the same inclination angle as said first inclined orbital plane, has the same cluster of satellites as in said first cluster, has the same asymmetrical spacing as said first asymmetrical spacing, and has the same open space as said first open space, said first and additional orbital planes being distributed about said reference circle, phasing all of the satellites so that corresponding satellites in each orbital plane all reside on a single wave form which rotates around the earth on an axis normal to the plane of reference for the inclination angle of the planes, and wherein the wave form has at least two cycles, and wherein there is a leading wave form containing a leading satellite in each orbital plane and a trailing wave form containing a trailing satellite in each orbital plane.

2. The invention defined in claim 1 wherein the number of satellites in the partially filled orbit planes and the space between the satellites in each orbital plane and the relative phasing of each orbital plane are sufficient to fill the space between the leading and trailing wave forms so that the entire earth can be covered in single layers of satellite coverage patterns at least up to some desired latitude from said reference circle.

3. The invention defined in claim 1 wherein the single wave form is wave form having two cycles.

4. The invention defined in claim 1 including deploying at least one extra satellite in each orbit plane.

5. The invention defined in claim 1 including deploying extra satellites in a parking orbit about the earth.

6. The invention defined in claim 5 including repositioning satellites from the parking orbit to replace certain satellites in certain orbit planes or to change the spacings of the satellites in all of the orbit planes.

7. The invention defined in claim 1 including adding satellites to the orbit planes to fully populate the orbit planes and to provide double coverage for stereo.

8. The invention defined in claim 1 including deleting certain satellites in certain orbit planes to produce a hexagon configuration with an open center between related satellites in three related, adjacent wave forms.

9. The invention defined in claim 1 wherein a length of said first cluster of satellites is more than 180° measured from the leading satellite to the trailing satellite in the cluster.

10. The invention defined in claim 1 wherein a length of said first cluster of satellites is less than 180° measured from the leading satellite to the trailing satellite in the cluster.

11. The invention defined in claim 1 including phasing all of the orbit planes so that there is a shear zone between the descending waves and the ascending waves and so that the descending waves are close to, but do not overlap, the ascending waves.

12. The invention defined in claim 1 including phasing all of the orbit planes so that there is a shear zone between the descending waves and the ascending waves and so that there is a slight overlap between the leading and trailing satellites of a descending wave and of an ascending wave in the shear zone.

13. The invention defined in claim 1 including at least one ground station for communicating with one or more satellites in said constellation.

14. The invention defined in claim 1 wherein there is equal spacing between each satellite and each adjacent satellite in each first cluster except for the spacing between the leading satellite and the trailing satellite in the cluster.

15. The invention defined in claim 1 including determining the earth coverage desired and configuring the asymmetric spacing in each orbital plane which is required to obtain the desired coverage in single layers.

16. The invention defined in claim 1 wherein each satellite has an angle of coverage looking down at the earth.

17. The invention defined in claim 16 wherein each of said first clusters has eleven satellites per cluster, there are twenty one orbital planes, each of the satellites within said first clusters are spaced at equal intervals of 18.947°, the gap between the trailing satellite and the leading satellite in each of said first clusters is 170.53°, each satellite is in a circular orbit at an altitude of 1,360 kilometers, each orbital plane is inclined at an angle of 70° with respect to the equator of the earth, and each adjacent orbital plane to the east is advanced 325.714° in phase.

18. The invention defined in claim 1 wherein the satellites have an angle of coverage which looks above the horizon of the earth.

19. The invention defined in claim 18 including positioning all of the satellites in all of the clusters at an altitude with respect to the earth such that each satellite has a cone of non-coverage in its zone of above the horizon coverage because of visual impairment which can be caused by the earth and which can be caused also in at least some cases by an atmosphere layer surrounding the earth, positioning the satellites in a first cluster in certain orbit planes such that said cones in the above the horizon coverage of each of the satellites in the cluster are at least partially covered by the coverage of one or more other satellites within said first cluster, said trailing satellite in said first cluster being spaced so far from the leading satellite in said first cluster that (a) there is a gap in the above the horizon coverage between the trailing satellite and the leading satellite in said first cluster and (b) the gap in the above the horizon coverage must be covered by one or more other satellites either in one or more other orbit planes or in one or more other clusters in the same orbit plane, phasing the orbits of said first clusters of satellites in said certain orbit planes so that the satellites in said clusters form waves in which at least certain ones of satellites in one or more adjacent waves produce continuous above the horizon coverage within said gap, and whereby the orbit planes do not need to be fully populated with satellites and whereby a constellation having asymmetric arrangements of satellites in orbit planes can provide continuous above the horizon coverage at a given altitude of orbit.

20. The invention defined in claim 18 wherein the number of clusters in an orbit plane is determined by the number of lead satellites in a plane to form the desired wave structure.

21. The invention defined in claim 20 wherein the waves are three cycle waves, each orbit plane has a first cluster of three equally spaced satellites and a second cluster of three equally spaced satellites, there are five orbit planes equally spaced at 72° intervals about the equator of the earth, each orbit plane is inclined at 55° with respect to the equatorial plane of the earth, each orbit plane at the next 72° interval to the east is advanced 72° in phase compared to its adjacent orbit plane, and the orbit altitude of the satellites is 2,000 kilometers.

22. A method of positioning satellites in coherent waves in an asymmetric open rosette constellation architecture orbiting about the earth so as to provide above the horizon coverage which extends into cones of non-coverage of individual satellites in the constellation and which also extends into the gaps between trailing and leading satellites in the asymmetric clusters of satellites in orbit planes of the constellation, said method comprising, forming a constellation of satellites having a plurality of orbit planes, each orbit plane being inclined at the same angle with respect to a reference great circle on the earth, each orbit plane having an asymmetric cluster of satellites in the orbit plane, each cluster of satellites having a leading satellite and a trailing satellite in the cluster, positioning all of the satellites in all of the clusters at an altitude with respect to the earth such that each satellite has a cone of non-coverage in its zone of above the horizon coverage because of visual impairment which can be caused by the earth and which can be caused also in at least some cases by an atmosphere layer surrounding the earth, positioning the satellites in a first cluster in certain orbit planes such that said cones in the above the horizon coverage of each of the satellites in the cluster are at least partially covered by the coverage of one or more other satellites within said first cluster, said trailing satellite in said first cluster being spaced so far from the leading satellite in said first cluster that (a) there is a gap in the above the horizon coverage between the trailing satellite and the leading satellite in said first cluster and (b) said gap in the above the horizon coverage must be covered by one or more other satellites either in one or more other orbit planes or in one or more other clusters in the same orbit plane, phasing the orbits of said first clusters of satellites in said certain orbit planes so that the satellites in said clusters form waves in which at least certain ones of satellites in one or more adjacent waves produce continuous above the horizon coverage within said gap, and whereby the orbit planes do not need to be fully populated with satellites and whereby a constellation having asymmetric arrangements of satellites in orbit planes can provide continuous above the horizon coverage at a given altitude of orbit.

23. The method defined in claim 22 wherein the great circle on the earth is the equator.

24. The invention defined in claim 23 wherein there are equal spacings between the orbital planes at the equator.

25. The invention defined in claim 22 wherein the cone of each satellite in the first cluster is entirely overlapped and covered by the coverage of one or more other satellites within the cluster.

26. The invention defined in claim 22 wherein the satellites are evenly spaced from one another within said clusters except for the spacing between the leading satellite and the trailing satellite.

27. The invention defined in claim 22 wherein the satellites within each cluster are unevenly spaced with respect to one another but each cluster has the same relative positioning of specific satellites within the cluster.

28. The invention defined in claim 22 wherein each orbit plane has only one asymmetric cluster of satellites in the orbit plane and wherein the phasing of the orbits form two cycle waves.

29. The invention defined in claim 22 wherein each orbit plane has a second asymmetric cluster of satellites within the orbit ring and wherein the orbit planes are phased to produce three cycle waves.

30. A constellation of satellites deployed in an asymmetric open rosette architecture rotating about the earth, said constellation being of the kind which has multiple inclined orbital planes with satellites in each orbital plane asymmetrically spaced in a cluster so as to leave an open space or gap between a trailing satellite and a leading satellite in each of the orbital planes of the constellation, said constellation comprising, a first cluster of satellites in a first asymmetrical spacing in a first orbital plane inclined at a first angle with respect to a reference circle extending about the earth, said first cluster having a leading satellite and a trailing satellite, said first cluster of satellites populating only a portion of the orbital plane so as to leave a first open space or gap between the trailing satellite and the leading satellite in said first inclined orbital plane, additional clusters of satellites placed in asymmetrical spacings in additional inclined orbital planes and wherein each additional inclined orbital plane has the same inclination angle as said first inclined orbital plane, has the same cluster of satellites as in said first cluster, has the same asymmetrical spacing as said first asymmetrical spacing, and has the same open space as said first open space, said first and additional orbital planes being distributed about said reference circle, all of the satellites being phased so that corresponding satellites in each orbital plane all reside on a single wave form which rotates about the celestial body on an axis normal to the plane of reference for the inclination angle of the planes, and wherein the wave form has at least two cycles, and wherein there is a leading wave form containing a leading satellite in each orbital plane and a trailing wave form containing a trailing satellite in each orbital plane.

31. The invention defined in claim 30 wherein the number of satellites in the partially filled orbital planes and the space between the satellites in each orbital plane and the relative phasing of each orbital plane are sufficient to fill the space between the leading and trailing wave forms so that the entire earth can be covered in single layers of satellite coverage patterns at least up to some desired latitude from said reference circle.

32. The invention defined in claim 30 wherein the single wave form is a wave form having two cycles.

33. The invention defined in claim 30 wherein at least one extra satellite is deployed in each orbit plane.

34. The invention defined in claim 30 wherein extra satellites are deployed in a parking orbit about the earth.

35. The invention defined in claim 34 wherein satellites from the parking orbit have been repositioned to replace certain satellites in certain orbit planes or to change the spacing of all of the satellites in all of the orbit planes.

36. The invention defined in claim 30 wherein additional satellites have been added to the orbit planes to fully populate the orbit planes and to provide double coverage for stereo.

37. The invention defined in claim 30 wherein certain satellites in certain orbit planes have been deleted to produce a hexagon configuration with an open center between related satellites in three related, adjacent wave forms.

38. The invention defined in claim 30 wherein a length of said first cluster of satellites is more than 180° measured from the leading satellite to the trailing satellite in the cluster.

39. The invention defined in claim 30 wherein all of the orbit planes have been phased so that there is a shear zone between the descending waves and the ascending waves and so that the descending waves are close to, but do not overlap, the ascending waves.

40. The invention defined in claim 30 wherein all of the orbit planes have been phased so that there is a shear zone between the descending waves and the ascending waves and so that there is a slight overlap between the leading and trailing satellites of a descending wave and of an ascending wave in the shear zone.

41. The invention defined in claim 30 including at least one ground station for communicating with one or more satellites in said constellation.

42. The invention defined in claim 30 wherein there is equal spacing between each satellite and each adjacent satellite in each first cluster except for the spacing between the leading satellite and the trailing satellite in the cluster.

43. The invention defined in claim 30 wherein the desired coverage of the earth has been determined and wherein the asymmetric spacing in each orbital plane has been configured as required to obtain the desired coverage in single layers.

44. The invention defined in claim 30 wherein each satellite has an angle of coverage looking down at the earth.

45. The invention defined in claim 30 wherein the satellites have an angle of coverage which looks above the horizon of the celestial body.

46. The invention defined in claim 45 wherein all of the satellites in all of the clusters are positioned at an altitude with respect to the earth such that each satellite has a cone of non-coverage in its zone of above the horizon coverage because of visual impairment which can be caused by the earth and which can be caused also in at least some cases by an atmosphere layer surrounding the earth, the satellites are positioned in a first cluster in certain orbit planes such that said cones in the above the horizon coverage of each of the satellites in the cluster are at least partially covered by the coverage of one or more other satellites within said first cluster, said trailing satellite in said first cluster is spaced so far from the leading satellite in said first cluster that (a) there is a gap in the above the horizon coverage between the trailing satellite and the leading satellite in said first cluster and (b) the gap in the above the horizon coverage must be covered by one or more other satellites either in one or more other orbit planes or in one or more other clusters in the same orbit plane, the orbits of said first clusters of satellites in said certain orbit planes are phased so that the satellites in said clusters form waves in which at least certain ones of satellites in one or more adjacent waves produce continuous above the horizon coverage within the gap, and whereby the orbit planes do not need to be fully populated with satellites and whereby a constellation having asymmetric arrangements of satellites in orbit planes can provide continuous above the horizon coverage at a given altitude of orbit.

47. A constellation of satellites positioned in coherent waves in an asymmetric open rosette architecture so as to provide above the horizon coverage which extends into cones of non-coverage of individual satellites in the constellation and in such and which also extends into the gaps between trailing and leading satellites in asymmetric clusters of satellites in orbit planes of the constellation, such constellation comprising, a constellation of satellites having a plurality of generally circular orbit planes, each orbit plane being inclined at the same angle with respect to a reference great circle on the earth, each orbit plane having an asymmetric cluster of satellites in the orbit plane, each cluster of satellites having a leading satellite and a trailing satellite in the cluster, all of the satellites in all of the clusters being positioned at an altitude with respect to the sphere such that each satellite has a cone of non-coverage in its zone of above the horizon coverage because of visual impairment which can be caused by the earth and which can be caused also in at least some cases by an atmosphere layer surrounding the earth, the satellites in certain orbit planes being positioned in a first cluster such that said cones in the above the horizon coverage of each of the satellites in the cluster are at least partially overlapped and at least partially covered by the coverage of one or more other satellites within said first cluster, said trailing satellite in said first cluster being spaced so far from the leading satellite in said first cluster that (a) there is a gap in the above the horizon coverage between the trailing satellite and the leading satellite in said first cluster and (b) said gap in the above the horizon coverage must be covered by one or more other satellites either in one or more other orbit planes or in one or more other clusters in the same orbit plane, the orbits of said first clusters of satellites in said certain orbit planes being phased so that the satellites in said clusters form waves in which at least certain ones of satellites in one or more adjacent waves produce continuous above the horizon coverage within said gap, and whereby the orbit planes do not need to be fully populated with satellites and whereby a constellation having asymmetric arrangements of satellites in orbit planes can provide continuous above the horizon coverage at a given altitude of orbit.

48. The invention defined in claim 47 wherein the great circle on the earth is the equator.

49. The invention defined in claim 48 wherein there are equal spacings between the orbital planes at the equator.

50. The invention defined in claim 47 wherein the cone of each satellite in the first cluster is entirely overlapped and covered by the coverage of one or more other satellites within the cluster.

51. The invention defined in claim 47 wherein the satellites are evenly spaced from one another within said clusters except for the spacing between the leading satellite and the trailing satellite.

52. The invention defined in claim 47 wherein the satellites within each cluster are unevenly spaced with respect to one another but each cluster has the same relative positioning of specific satellites within the cluster.

53. The invention defined in claim 47 wherein each orbit plane has only one asymmetric cluster of satellites in the orbit plane and wherein the phasing of the orbits form two cycle waves.

54. The invention defined in claim 47 wherein the orbit rings are phased to produce three cycle waves.

55. The invention defined in claim 47 wherein the orbit rings are phased to produce more than three cycle waves.

* * * * *